US011275587B2

(12) United States Patent
Wallach

(10) Patent No.: US 11,275,587 B2
(45) Date of Patent: Mar. 15, 2022

(54) STATIC IDENTIFICATIONS IN OBJECT-BASED MEMORY ACCESS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/028,840

(22) Filed: Jul. 6, 2018

(65) Prior Publication Data

US 2019/0339974 A1 Nov. 7, 2019

Related U.S. Application Data

(60) Provisional application No. 62/665,936, filed on May 2, 2018.

(51) Int. Cl.
*G06F 9/30* (2018.01)
*G06F 9/34* (2018.01)

(52) U.S. Cl.
CPC .......... *G06F 9/30112* (2013.01); *G06F 9/342* (2013.01)

(58) Field of Classification Search
CPC ... G06F 9/32; G06F 9/34; G06F 12/08; G06F 12/0692
See application file for complete search history.

(56) References Cited

U.S. PATENT DOCUMENTS

| | | | |
|---|---|---|---|
| 4,445,177 A | 4/1984 | Bratt et al. | |
| 4,454,579 A | 6/1984 | Pilat et al. | |
| 4,514,800 A | 4/1985 | Gruner et al. | |
| 4,525,780 A | 6/1985 | Bratt et al. | |
| 4,660,142 A | 4/1987 | Clancy et al. | |
| 4,821,184 A | 4/1989 | Clancy et al. | |
| 5,226,161 A | 7/1993 | Khoyi et al. | |
| 6,446,188 B1 | 9/2002 | Henderson et al. | |
| 7,149,878 B1 | 12/2006 | Jensen et al. | |
| 7,366,882 B2 | 4/2008 | Sahraoui et al. | |
| 8,635,412 B1 | 1/2014 | Wilshire | |
| 8,862,861 B2 | 10/2014 | Olson et al. | |
| 9,798,873 B2 | 10/2017 | Glew et al. | |
| 9,886,532 B1 | 2/2018 | Scallon | |
| 10,761,855 B2 | 9/2020 | Wallach | |
| 2002/0031135 A1* | 3/2002 | Inoue ................ | H04L 29/12216 370/401 |

(Continued)

OTHER PUBLICATIONS

"Branch Predictor", https://en.wikipedia.org/wiki/Branch_predictor, printed on Apr. 30, 2018, 12 pages.
Speculative execution, Wikipedia, printed on Jun. 27, 2018.
URL, Wikipedia, printed on Oct. 12, 2018.
Branch predictor, Wikipedia, printed on Jun. 27, 2018.
Computer file, Wikipedia, printed on Oct. 12, 2018.
File system, Wikipedia, printed on Oct. 12, 2018.

(Continued)

*Primary Examiner* — Jacob Petranek
(74) *Attorney, Agent, or Firm* — Greenberg Traurig

(57) ABSTRACT

A computer system having an address system of a first predetermined width in which each address of the first predetermined width in the address system includes a first portion identifying an object and a second portion identifying an offset relative to the object, where a static identifier for the first portion is predetermined to identify an address space having a second predetermined width that is smaller than the first predetermined width, or a space of kernel objects.

18 Claims, 3 Drawing Sheets

(56) References Cited

U.S. PATENT DOCUMENTS

| | | |
|---|---|---|
| 2002/0174327 A1 | 11/2002 | Kruckemyer et al. |
| 2002/0174328 A1 | 11/2002 | Kruckemyer |
| 2003/0033344 A1 | 2/2003 | Abbott et al. |
| 2003/0140085 A1 | 7/2003 | Moir et al. |
| 2004/0103213 A1* | 5/2004 | Park .................. H04L 29/12207 709/245 |
| 2006/0095895 A1 | 5/2006 | K. |
| 2007/0043531 A1 | 2/2007 | Kosche et al. |
| 2009/0327613 A1* | 12/2009 | Nutter .................. G06F 12/0875 711/141 |
| 2009/0327617 A1 | 12/2009 | Furuichi et al. |
| 2010/0118734 A1* | 5/2010 | Weilnau, Jr. ...... H04L 29/12358 370/254 |
| 2010/0228936 A1 | 9/2010 | Wright et al. |
| 2010/0235598 A1 | 9/2010 | Bouvier |
| 2011/0314238 A1 | 12/2011 | Finkler et al. |
| 2012/0254497 A1 | 10/2012 | Ni et al. |
| 2013/0132695 A1 | 5/2013 | Heo et al. |
| 2014/0025770 A1* | 1/2014 | Warfield ........... G06F 15/17331 709/213 |
| 2014/0181480 A1 | 6/2014 | Diestelhorst et al. |
| 2015/0046661 A1 | 2/2015 | Gathala et al. |
| 2015/0370561 A1 | 12/2015 | Stark |
| 2016/0210082 A1 | 7/2016 | Frank et al. |
| 2016/0350019 A1 | 12/2016 | Koufaty et al. |
| 2016/0364172 A1 | 12/2016 | Frank et al. |
| 2016/0371496 A1 | 12/2016 | Sell |
| 2016/0381050 A1 | 12/2016 | Shanbhogue et al. |
| 2017/0091444 A1 | 3/2017 | Woodward et al. |
| 2017/0147505 A1 | 5/2017 | Baxter et al. |
| 2017/0199815 A1* | 7/2017 | Frank .................. G06F 12/0223 |
| 2018/0113811 A1 | 4/2018 | King |
| 2018/0191671 A1* | 7/2018 | Choi .................. H04L 61/6059 |
| 2019/0196983 A1 | 6/2019 | Khosravi et al. |
| 2019/0339977 A1 | 11/2019 | Wallach |
| 2020/0073822 A1 | 3/2020 | Wallach |
| 2020/0133677 A1 | 4/2020 | Wallach |
| 2020/0356374 A1 | 11/2020 | Wallach |

OTHER PUBLICATIONS

Steve Wallach, "128-Bit Addressing in RISC-V and Security", 5th RISC-V Workshop Proceedings, Nov. 2016.
Instruction set architecture, Wikipedia, printed on Oct. 16, 2018.
Jann Hom, "Project Zero: Reading privileged memory with a side-channel", Jan. 3, 2018.
Mark D. Hill, "On the Meltdown & Spectre Design Flaws", Feb. 2018.
Memory address register, Wikipedia, printed on Jun. 26, 2018.
Memory address, Wikipedia, printed on Jun. 26, 2018.
Operating system, Wikipedia, printed on Apr. 18, 2018.
Pointer, Wikipedia, printed on Oct. 11, 2018.
Program counter, Wikipedia, printed on Jun. 26, 2018.
Reference, Wikipedia, printed on Oct. 12, 2018.
The RISC-V Instruction Set Manual, vol. II: Privileged Architecture, May 7, 2017.
The RISC-V Instruction Set Manual, vol. I: User-Level ISA, May 7, 2017.
International Search Report and Written Opinion, PCT/US2019/048006, dated Dec. 11, 2019.
International Search Report and Written Optinion, PCT/US2019/056819, dated Feb. 7, 2020.
Chen, et al. "Control Flow Obfuscation with Information Flow Tracking," ACM, 2009.
Wolczko, et al. "The influence of the Object-Oriented Language Model on a Supporting Architecture," Kluwer Academic Publishers, 1994.
Securing Conditional Speculative Instruction Execution, U.S. Appl. No. 16/028,750, filed Jul. 6, 2018 Inventor(s): Steven Wallach Status: Docketed New Case—Ready for Examination Status Date: Dec. 16, 2018.
Universal Pointers for Data Exchange in a Computer System Having Independent Processors, U.S. Appl. No. 16/170,799, filed Oct. 25, 2018 Inventor(s): Steven Wallach Status: Docketed New Case—Ready for Examination Status Date: Dec. 14, 2018.

\* cited by examiner

STATIC IDENTIFICATIONS IN OBJECT-BASED MEMORY ACCESS

RELATED APPLICATIONS

The present application claims the benefit of the filing date of Prov. U.S. Pat. App. Ser. No. 62/665,936, filed May 2, 2018 and entitled "Static Identifications in Object-based Memory Access," the entire disclosure of which application is hereby incorporated herein by reference.

The present application relates to U.S. patent application Ser. No. 16/028,750, filed on the same day as the present application and entitled "Securing Conditional Speculative Instruction Execution", which claims the benefit of the filing date of Prov. U.S. Pat. App. Ser. No. 62/665,743, filed May 2, 2018 and entitled "Static Identifications in Object-based Memory Access," the entire disclosures of which applications are hereby incorporated herein by reference.

FIELD OF THE TECHNOLOGY

At least some embodiments disclosed herein relate generally to computer architecture and more specifically, but not limited to, memory addresses for computer processors.

BACKGROUND

A memory address in a computing system identifies a memory location in the computing system. Memory addresses are fixed-length sequences of digits conventionally displayed and manipulated as unsigned integers. The length of the sequences of digits or bits can be considered the width of the memory addresses. Memory addresses can be used in certain structures of central processing units (CPUs), such as instruction pointers (or program counters) and memory address registers. The size or width of such structures of a CPU typically determines the length of memory addresses used in such a CPU.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of using static object identification numbers in addresses of a predetermined width (e.g., 128-bit) for an instruction set (e.g., 128-bit instructions) to represent certain types of objects, such as kernel objects, objects using addresses of a smaller width (e.g., 64-bit, 32-bit) that are generated and/or used by other instruction sets (e.g., 64-bit instructions, 32-bit instructions), etc. In general, the addresses of the predetermined width (e.g., 128-bit) can be generated using various instruction sets (e.g., 128-bit instructions, 64-bit instructions, 32-bit instructions) in various processors that can use such instruction sets to generate and/or use addresses of the predetermined width (e.g., 128-bit). Thus, the predetermined width (e.g., 128-bit) is not limited to a particular type of instruction sets and/or instructions of a particular width.

Figure 1:
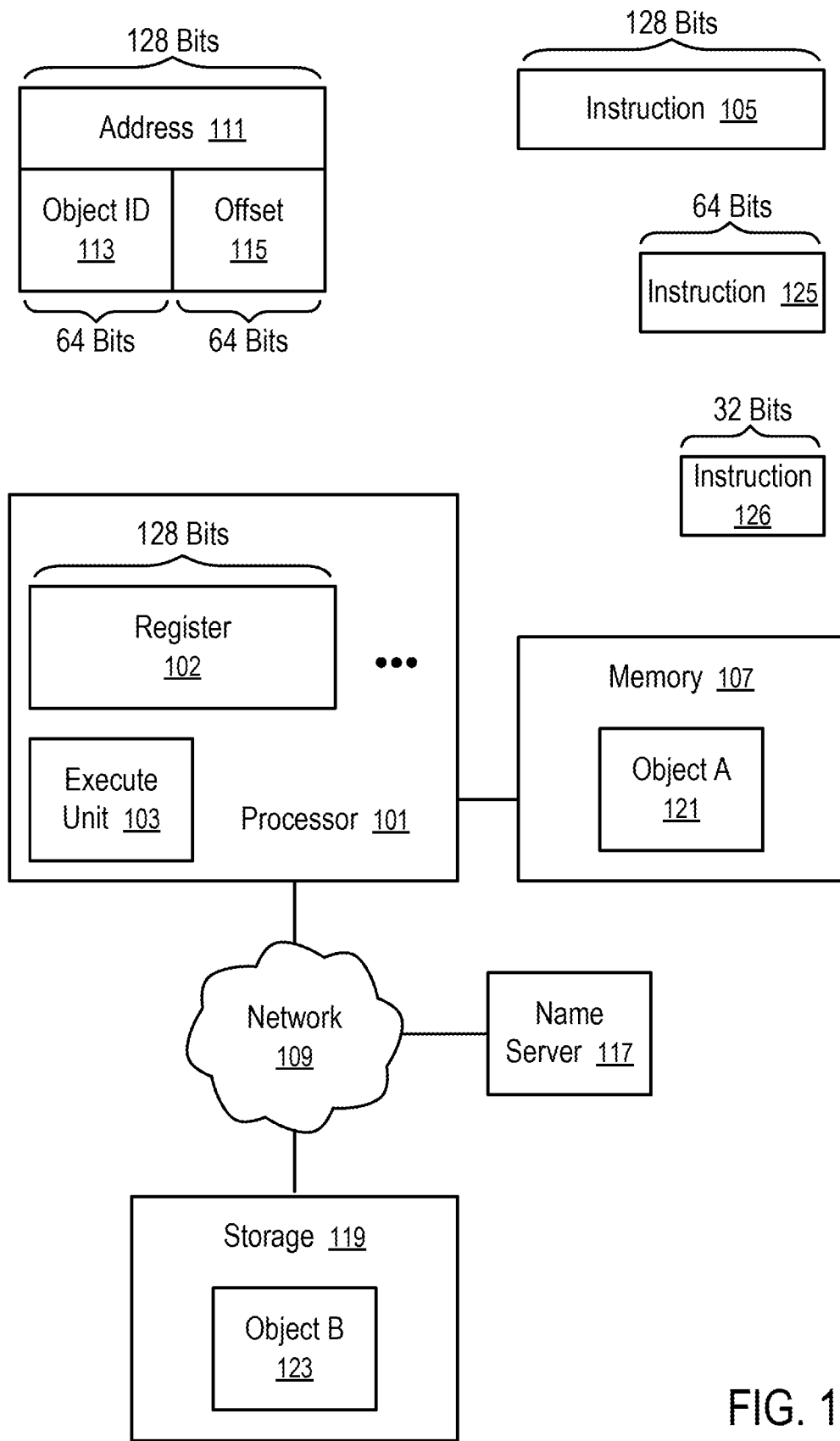
FIG. 1 shows a computer system using an address system according to one embodiment.

FIG. 1 shows a computer system using an address system according to one embodiment.

In FIG. 1, a processor (101) (e.g., a microprocessor or CPU) has an execution unit (103) to perform operations of instructions (e.g., 105) programmed according to one or more instruction sets that can generate 128-bit virtual memory addresses (e.g., 128-bit instruction set).

An example of the 128-bit instruction set is RV128 of RISC-V instruction set identified by the RISC-V Foundation.

The processor (101) is configured with registers (e.g., 102) of a predetermined width, such as 128 bits. The processor (101) can fetch an instruction (105) of the predetermined width, and use an execute unit (103) to perform operations on data provided in the instruction (105) and/or data provided in one or more registers (e.g., 102) identified in the instruction (105), and when applicable, store the result of the operations identified by the instruction (105) in a register identified in the instruction (105).

The registers (e.g., 102) can include a memory register of the predetermined width (e.g., 128 bits) and/or an instruction pointer (or program counter) of the predetermined width (e.g., 128 bits).

For example, an instruction can be coded according to the predetermined specification of an instruction set to perform integer computation (e.g., add, or, xor), to perform control transfer (e.g., jump, branch), to load data/instructions from memory at a memory location specified using an address (e.g., 111) of the predetermined width, or to store data at a memory location specified using an address (e.g., 111) of the predetermined width (e.g., 128 bits).

For example, the address (111) can be used to identify a memory location storing an instruction in the computer system; and the address (111) can be placed in an instruction pointer (or program counter) to identify the instruction to be executed by the processor (101).

For example, the address (111) can be used to identify a memory location storing a data item in the computer system; and the address (111) can be placed in a memory register to identify the data to be operated upon by the processor (101) in executing an instruction.

Typically, a 128-bit instruction set can address a 128-bit address space. Similarly, a 64-bit instruction set can address a 64-bit address space; and a 32-bit instruction set can address a 32-bit address space.

In some instances, a 64-bit instruction (e.g., 125) (or a 32-bit instruction (e.g., 126)) can also generate and/or use a 128-bit address (e.g., 111). For example, when a 128-bit address is stored in an address register (e.g., 102), the 64-bit instruction (125) (or a 32-bit instruction (126)) executed in the processor (101) (and/or another processor) can operate upon or use the 128-bit address (111) and/or generate another 128-bit address. Thus, the width of memory addresses is not necessarily limited by the width of instructions that generate or use the memory addresses.

In the computer system illustrated in FIG. 1, a 128-bit address (111) is configured to include two portions: a 64-bit object ID (113) and a 64-bit offset (115) relative to the object identified by the object ID (113). For example, the offset (115) can be a byte offset.

The 64-bit offset (115) can be used for indexing, such as program counter, stack pointer, for loading data and/or instruction from a memory location or for storing data at the location. The memory location can be in a main memory (107) connected to the processor (101) via one communication channel (e.g., a memory bus), or a storage (119) connected to the processor via another communication channel (e.g., over a network 109)

FIG. 1 illustrates an example structure for a 128-bit address. Other size choices can be implemented to have the structure of an object ID (113) and an offset (113) relative to the object identified by the object ID. For example, the width of the address can be different from 128 bits. For example, the object ID (113) and the offset (115) can be configured to have different numbers of bits.

In general, the 128-bit address system illustrated in FIG. 1 can be configured to be independent from instruction set architecture such that different vendors of different processors (e.g., 103) having different instruction sets can use the same address system. The memory access request made using the address (128) can be routed in a computer system over memory buses, input/output buses, and/or network (109) like routing internet protocol (IP) packets. Preferably, the association between a memory/storage location and the address (111) is persistent across time and space.

In response to an instruction (105, 125 or 126), the processor (101) can access a data item identified by the 128-bit memory address (111) stored in a register (102). The object ID (113) of the address (111) is usable to identify an object having a distinct name. Such an object can be a software or hardware structure with a name controlled, allocated, issued, and/or registered by a centralized name server (117). The name server (117) can be coupled to the processor (101) via a computer network (109); and the object (e.g., 121 or 123) represented by the object ID (113) can be in the memory (107) that is coupled to the processor (101) via a memory bus, or in a storage (119) that is coupled to the processor (101) via the network (109), or in memory coupled to another processor on the network (109).

An object identified by an object ID (113) in the address (111) can be used to specify location and protection mechanisms, language specific/architecture attributes, such as partitioned global address space (PGAS) node), data encrypted, and/or blockchain.

The object ID (113) of the corresponding object (121 or 123) can be created or allocated using the name server (117) for the entire computer system connected by the network (109), which can include the Internet.

Preferably, the address space using addresses (e.g., 111) in the format illustrated in FIG. 1 is unique over time and space. Any computer supporting the address space is addressable on the network (109) by the name server (117).

When a processor (101) is accessing an object for the first time, the access can require verification of permission to access (e.g., download an executable file, access an entry in an Access Control List (ACL)), and verification of access privileges for the object (e.g., read, write, execute, access through a protected sub-object, execution domain). Execution domain can be identified via classifications of the levels of users (e.g., gold, platinum, executive platinum) and admin level (e.g., 1, 2, . . . , n).

Figure 2:
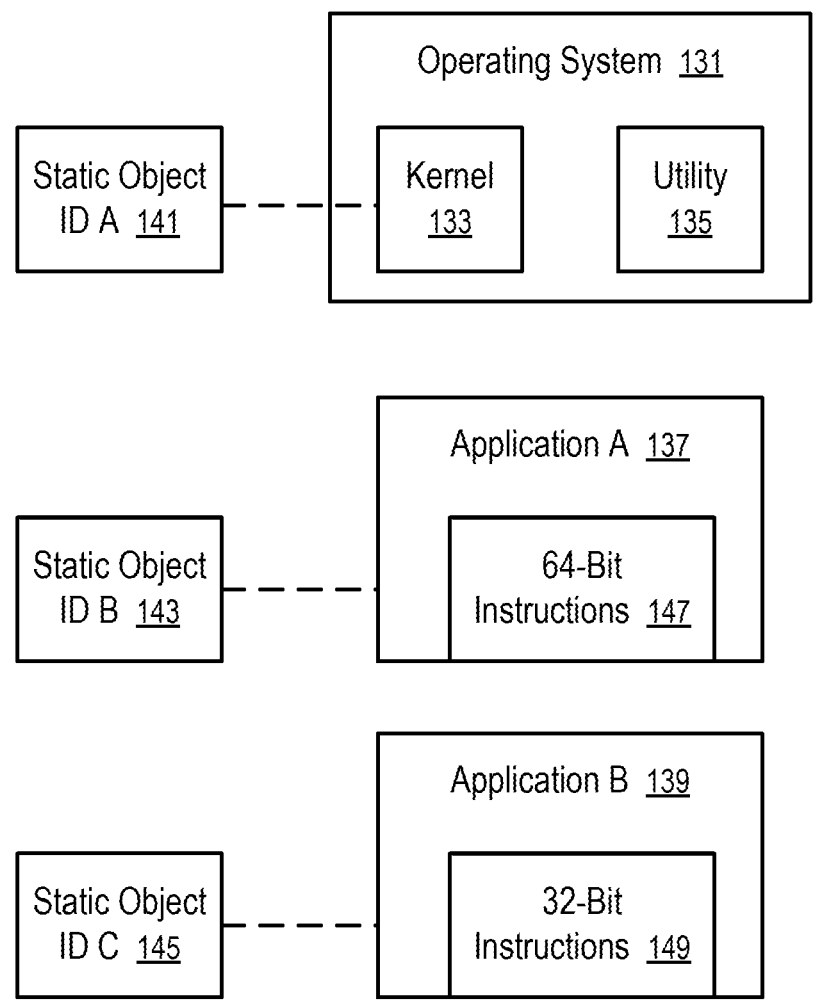
FIG. 2 shows static object identifications in an address system of FIG. 1.

Certain static object IDs can be used to identify predetermined object types or object spaces, as illustrated in FIG. 2.

FIG. 2 shows static object identifications in an address system of FIG. 1.

For example, an object ID (141) having a predetermined value of zero (0) can be used to identify any kernel object (133) of an operating system (131); and the object ID (141) can be static for kernel objects (e.g., 133) across all the nodes in the computer system, regardless of the location of the kernel object (133) in the computer system. The operation system (131) can have utilities (e.g., 135) are not part of the kernel (133).

For example, an object ID (143) having a predetermined value of one (1) can be used to identify any object of an application (137) programmed using 64-bit instructions (143); and the object ID (143) can be static for 64-bit instruction objects (e.g., 137) across all the nodes in the computer system, regardless of the location of the 64-bit instruction object (137) in the computer system.

For example, an object ID (145) having a predetermined value of two (2) can be used to identify any object of an application (139) programmed using 32-bit instructions (147); and the object ID (145) can be static for 32-bit instruction objects (e.g., 139) across all the nodes in the computer system, regardless of the location of the 32-bit instruction object (139) in the computer system.

The static object IDs (141, 143, and/or 145) provide predetermined information about the objects accessed via the memory addresses (e.g., 111) having the static object IDs (141, 143, and/or 145).

For example, when the processor (101) accesses a memory location using the address (111) where the object ID (113) is the static object ID (141), the processor (101) can determine that the data or instruction stored in the memory location is for a kernel object (133) of an operating system (131). Thus, the processor (101) can adjust its operations (e.g., priority level, security level) based on the information that the accessed memory is for an operating system kernel (133).

Similarly, when the processor (101) accesses a memory location using the address (111) where the object ID (113) is the static object ID (143 or 145), the processor (101) can determine that the data or instruction stored in the memory location is for a 64-bit application (137) or a 32-bit application (139). Thus, the processor (101) can adjust its operations to optimize performances, priority and/or security for the application.

In general, static object IDs (e.g., 141, 143, and/or 145) can be used to provide the processor (101) with predetermined information about the objects referenced by the memory address (111) containing the static object IDs (e.g., 141, 143, and/or 145), without a need to contact the name server (117) to look up the property of the objects (e.g., 121 or 123). Thus, the computer system and/or the processor (101) can use the predetermined information in efficiently processing the data and/or instruction fetched using the address (111) that contains the static object IDs (e.g., 141, 143, or 145). For example, a static ID can be used to identify a partitioned global address space (PGAS) address of a predetermined width (e.g., 128-bit or 64 bit), a version of internet protocol addresses (e.g., Internet Protocol version 6 (IPv6)), a unique ID, etc. For example, a static ID can be used to indicate whether the object is a user object, a kernel object of an operating system (OS), or a non-kernel portion of an OS/server object. For example, a static ID can be used to indicate whether a system call is invoked, whether a call to the non-kernel portion of an OS/server is invoked, or whether a call to the kernel of an OS is invoked. In some instances, an address can have more than one static object ID encoded therein according to a predetermined scheme. For example, the static object IDs can be provided in an address without being limited to a particular 64-bit field of the address.

Figure 3:
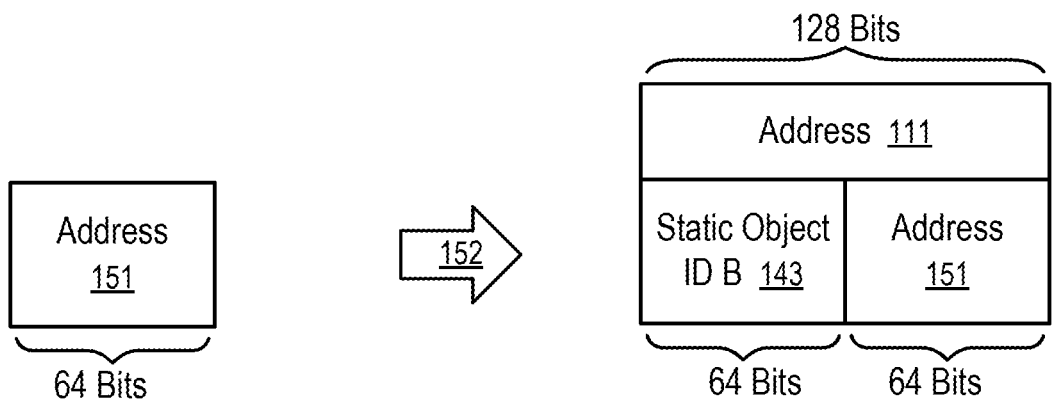
FIGS. 3 and 4 illustrate the use of static object identifications to map addresses of different address spaces.
Figure 4:
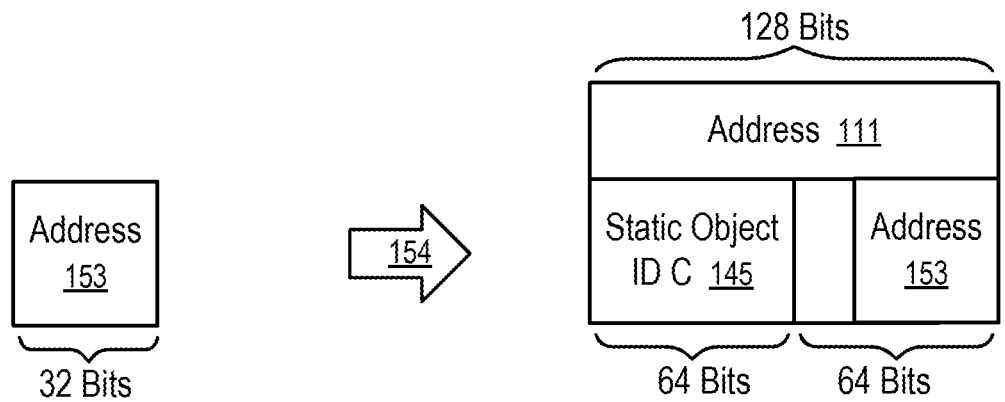

FIGS. 3 and 4 illustrate the use of static object identifications to map addresses of different address spaces.

Using the static object identifications (143 and 145), a computing system can automatically map the 64-bit address space and the 32-bit address space to the 128-bit address space according to predetermined rules. The conversion rule allows a 128-bit processor to run 64-bit applications and 32-bit applications.

For example, a 64-bit address (151) used by an application (137) programmed using 64-bit instructions (147) can be converted to a 128-bit address using the predetermined object ID (143) (e.g., a predetermined value of one (1)) for 64-bit objects, and using the 64-bit address (151) as the offset (115) in the 128-bit address (111), as illustrated in FIG. 3.

For example, a 32-bit address (153) used by an application (139) programmed using 32-bit instructions (149) can be converted to a 128-bit address using the predetermined object ID (145) (e.g., a predetermined value of two (2)) for 32-bit objects, and using the 32-bit address (153) as the offset (115) in the 128-bit address (111), as illustrated in FIG. 4.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to performing processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A computer system, comprising:
    a register of a first predetermined width, the register to store an address having:
        a first portion identifying an object; and
        a second portion identifying an offset relative to the object; and
    an execution unit configured to execute an instruction using the address;
    wherein when the first portion has a first static identifier, a first predetermined property of a first class of objects pre-associated with the first static identifier is used in executing the instruction, wherein the first class of objects is first applications using a first address space having a second predetermined width that is smaller than the first predetermined width;
    wherein when the first portion has a second static identifier, a second predetermined property of a second class of objects pre-associated with the second static identifier is used in executing the instruction, wherein the second class of objects is second applications using a second address space having a third predetermined width that is smaller than the first predetermined width and different from the second predetermined width.

2. The computer system of claim 1, wherein the first predetermined width is 128 bits; and the second predetermined width is one of: 64 bits and 32 bits.

3. The computer system of claim 2, wherein when the first static identifier has a value of one, the second predetermined width is 64 bits.

4. The computer system of claim 2, wherein when the first static identifier has a value of one, the second predetermined width is 32 bits.

5. The computer system of claim 1, wherein the first predetermined property is used in address conversion during executing instructions of the object.

6. The computer system of claim 5, wherein the address conversion includes converting an address from the second predetermined width to the first predetermined width.

7. The computer system of claim 6, wherein converting the address from the second predetermined width to the first predetermined width is performed using the static identifier as an object identifier and the address of the second predetermined width as an offset.

8. The computer system of claim 1, wherein the first class of objects is in a kernel of an operating system of the computer system.

9. The computer system of claim 8, wherein when the first static identifier has a value of zero.

10. The computer system of claim 1, wherein the instruction is loaded using the address for execution.

11. The computer system of claim 1, wherein execution of the instruction operates on a data item obtained from a memory location identified by the address.

12. The computer system of claim 1, wherein the first predetermined property is used to adjust a security operation during executing instructions of the object.

13. The computer system of claim 1, wherein the first predetermined property is used to adjust a priority during executing instructions of the object.

14. A method, comprising:
    receiving, in a processor, a first address in a first address space having a first predetermined width;
    determining, by the processor, a first predefined identifier predefined to represent the first address space;
    combining, by the processor, the first predefined identifier and the first address to generate a second address having a second predetermined width larger than the first predetermined width, wherein the second address has a first object identifier portion and a first offset portion, and the first object identifier portion of the second address contains the first predefined identifier representing the first address space and the first offset portion of the second address corresponds to the first address;
    receiving in the processor, a third address in a second address space having a third predetermined width different from the first predetermined width;

determining, by the processor, a second predefined identifier predefined to represent the second address space; and combining, by the processor, the second predefined identifier and the third address to generate a fourth address having a fourth predetermined width larger than the first predetermined width and larger than the third predetermined width, wherein the fourth address has a second object identifier portion and a second offset portion, the second object identifier portion of the fourth address contains the second predefined identifier representing the second address space and the second offset portion of the fourth address corresponds to the third address.

15. The method of claim 14, wherein the second predetermined width is 128 bits; and the first predetermined width is one of: 64 bits and 32 bits.

16. The method of claim 15, wherein the first object identifier portion of the second address has 64 bits; and the byte offset portion of the second address has 64 bits.

17. A computer system:
a processor; and
a memory address system comprising a plurality of memory addresses configured to cause the processor to perform operations based on data provided in a respective one of the plurality of memory addresses, wherein:

each of the plurality of memory addresses are of a first predetermined width, a first memory address of the plurality of memory addresses in the memory address system includes a first object identifier portion and a first offset portion, wherein a first predetermined value provided in the first object identifier portion represents a first object property pre-associated with the first predetermined value;

the first object property identifies a first subset of the plurality of memory addresses of a second predetermined width that is smaller than the first predetermined width;

a second memory address of the plurality of memory addresses in the memory address system includes a second object identifier portion and a second offset portion, wherein a second predetermined value provided in the second object identifier portion represents a second object property pre-associated with the second predetermined value; and the second object property identifies a second subset of the plurality of memory addresses of a third predetermined width that is different from the second predetermined width and that is smaller than the first predetermined width.

18. The computer system of claim 17, wherein the first object property identifies a kernel of an operating system.

* * * * *